(12) United States Patent
Huth et al.

(10) Patent No.: US 7,923,658 B2
(45) Date of Patent: Apr. 12, 2011

(54) LASER MICROMACHINING METHODS AND SYSTEMS

(75) Inventors: Mark Huth, Corvallis, OR (US); Philip G Rourke, Corvallis, OR (US); Craig M. Gates, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1751 days.

(21) Appl. No.: 10/976,555

(22) Filed: Oct. 29, 2004

(65) Prior Publication Data

US 2006/0054605 A1 Mar. 16, 2006

Related U.S. Application Data

(60) Provisional application No. 60/609,530, filed on Sep. 13, 2004.

(51) Int. Cl.
*B23K 26/00* (2006.01)

(52) U.S. Cl. .......... 219/121.69; 219/121.67; 219/121.68

(58) Field of Classification Search ............. 219/121.69, 219/121.67, 121.68, 121.71, 121.7, 121.85
See application file for complete search history.

(56) References Cited

U.S. PATENT DOCUMENTS

| | | |
|---|---|---|
| 3,556,600 A | 1/1971 | Shoupp et al. |
| 3,656,988 A | 4/1972 | Steffen et al. |
| 5,742,028 A | 4/1998 | Mannana et al. |
| 5,773,791 A | 6/1998 | Kuykendal |
| 6,333,488 B1 | 12/2001 | Lawrence et al. |
| 6,384,371 B1 | 5/2002 | Hinei et al. |
| 6,563,079 B1 | 5/2003 | Umetsu et al. |
| 6,864,460 B2 * | 3/2005 | Cummings et al. ...... 219/121.71 |
| 2002/0050489 A1 | 5/2002 | Ikegami et al. |
| 2002/0106418 A1 | 8/2002 | Fukushima et al. |
| 2002/0170891 A1 * | 11/2002 | Boyle et al. .............. 219/121.67 |
| 2003/0006220 A1 | 1/2003 | Cummings et al. |
| 2003/0062126 A1 * | 4/2003 | Scaggs ..................... 156/345.26 |
| 2003/0127441 A1 | 7/2003 | Haight |
| 2004/0197433 A1 * | 10/2004 | Terada et al. .............. 425/174.4 |
| 2005/0103758 A1 | 5/2005 | Otis et al. |

FOREIGN PATENT DOCUMENTS

| | | |
|---|---|---|
| JP | 2003-324263 | 11/2003 |
| JP | 2004-167590 | 6/2004 |
| WO | WO97/07928 | 3/1997 |
| WO | WO0247863 A1 * | 6/2002 |
| WO | WO 03/028941 | 4/2003 |
| WO | WO 03/028943 | 4/2003 |
| WO | WO03028941 A1 * | 4/2003 |
| WO | WO03028943 A1 * | 4/2003 |

* cited by examiner

*Primary Examiner* — M. Alexandra Elve

(57) ABSTRACT

A method of laser machining a substrate is provided. The method comprises directing laser energy at a first surface of the substrate, while providing an assist medium at the first surface of the substrate at least at approximately the area at which the laser energy is being directed. The assist medium is no longer provided prior to completion of formation of a feature in the substrate created utilizing the laser energy.

31 Claims, 10 Drawing Sheets

LASER MICROMACHINING METHODS AND SYSTEMS

CROSS-REFERENCE TO RELATED APPLICATIONS

This application claims the benefit of U.S. Provisional Application No. 60/609,530, filed on Sep. 13, 2004.

BACKGROUND

The market for electronic devices continually demands increased performance at decreased costs. In order to meet these requirements the components which comprise various electronic devices may be made more efficiently and to closer tolerances.

Laser micromachining is a common production method for controlled, selective removal of material. However, a desire exists to enhance laser machining performance, including, for example, reducing the likelihood of debris formation and other damage that may result from the laser micromachining process.

In certain laser micromachining applications an assist medium, such as a gas or a liquid, may be utilized during the laser micromachining process to improve performance. In these instances, however, the assist medium may cause undesired effects to the components and materials on certain portions of the device. Therefore, a desire exists to utilize assist mediums while minimizing the potential undesired effects that may be caused by the assist medium.

BRIEF DESCRIPTION OF THE DRAWINGS

Features of the invention will readily be appreciated by persons skilled in the art from the following detailed description of exemplary embodiments thereof, as illustrated in the accompanying drawings, in which.

DETAILED DESCRIPTION OF THE PREFERRED EMBODIMENTS

The embodiments described below pertain to methods and systems for laser micromachining a substrate. Laser micromachining is a production method for controlled, selective removal of substrate material. By removing substrate material, laser micromachining can form a feature, having desired dimensions, into the substrate. Such features can be either through features, such as vias or slots, which pass through a substrate's thickness or at least two surfaces of the substrate, or blind features, such as blind holes, pockets or trenches, which pass through a portion of the substrate's thickness or one surface of the substrate.

Laser machining removes substrate material at one or more laser interaction zone(s) to form a feature into a substrate. Some embodiments can supply liquid or gas to the laser interaction zone along one or more supply paths to increase the substrate removal rate and/or decrease the incidence of redeposition of substrate material proximate the feature and/or decrease the wall taper angle of the laser machined feature.

Examples of laser machining features will be described generally in the context of forming ink feed slots ("slots") in a substrate. Such slotted substrates can be incorporated into ink jet print cartridges or pens, and/or various micro electro mechanical systems (MEMS) devices, among other uses. The various components described below may not be illustrated to scale. Rather, the included figures are intended as diagrammatic representations to illustrate various principles that are described herein.

Examples of particular feature size, shape, and arrangement are depicted herein. However, any type of feature size and geometry may be fabricated using the inventive methods and apparatuses described herein.

Figure 1:
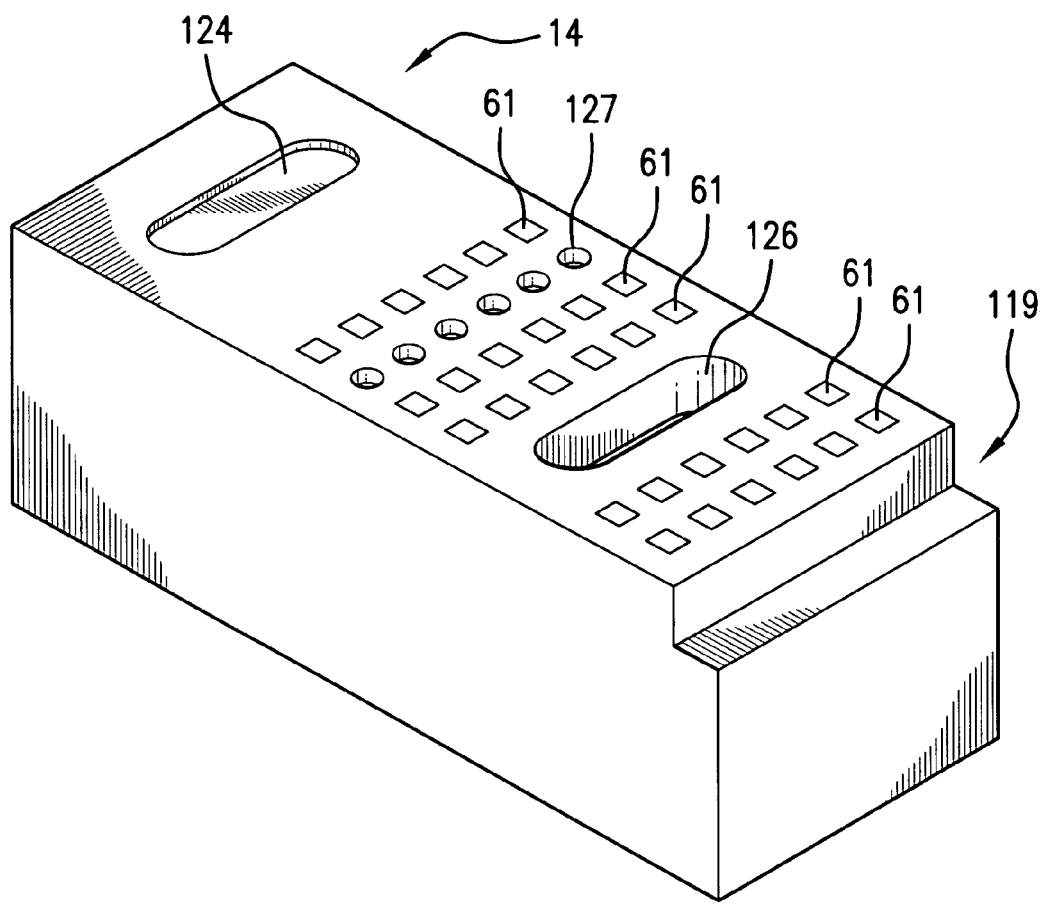
FIG. 1 illustrates a perspective view of one embodiment of a print head.

FIG. 1 illustrates an enlarged view of one embodiment of the printhead 14 in perspective view. The printhead 14 in this embodiment has multiple features, including an edge step 119 for an edge fluid feed to resistors (or fluid ejectors) 61. The printhead may also have a trench 124 that is partially formed into the substrate surface. A slot (or channel) 126 to feed fluid to resistors 61, and/or a series of holes 127 feeding fluid to resistors 61 are also shown on this printhead, each being formed by a UV laser machining process as described herein. In one embodiment there may be at least two of the features described on the printhead 14 in FIG. 1. For example, only the feed holes 127 and the slot 126 are formed in the printhead 14, where in an alternative embodiment the edge step 119 and/or the trench 124 are formed as well. In another example, the edge step 120, and the slot 126 are formed in the printhead 14, where in an alternative embodiment the trench 124 and/or the feedholes 127 are formed as well.

Figure 2:
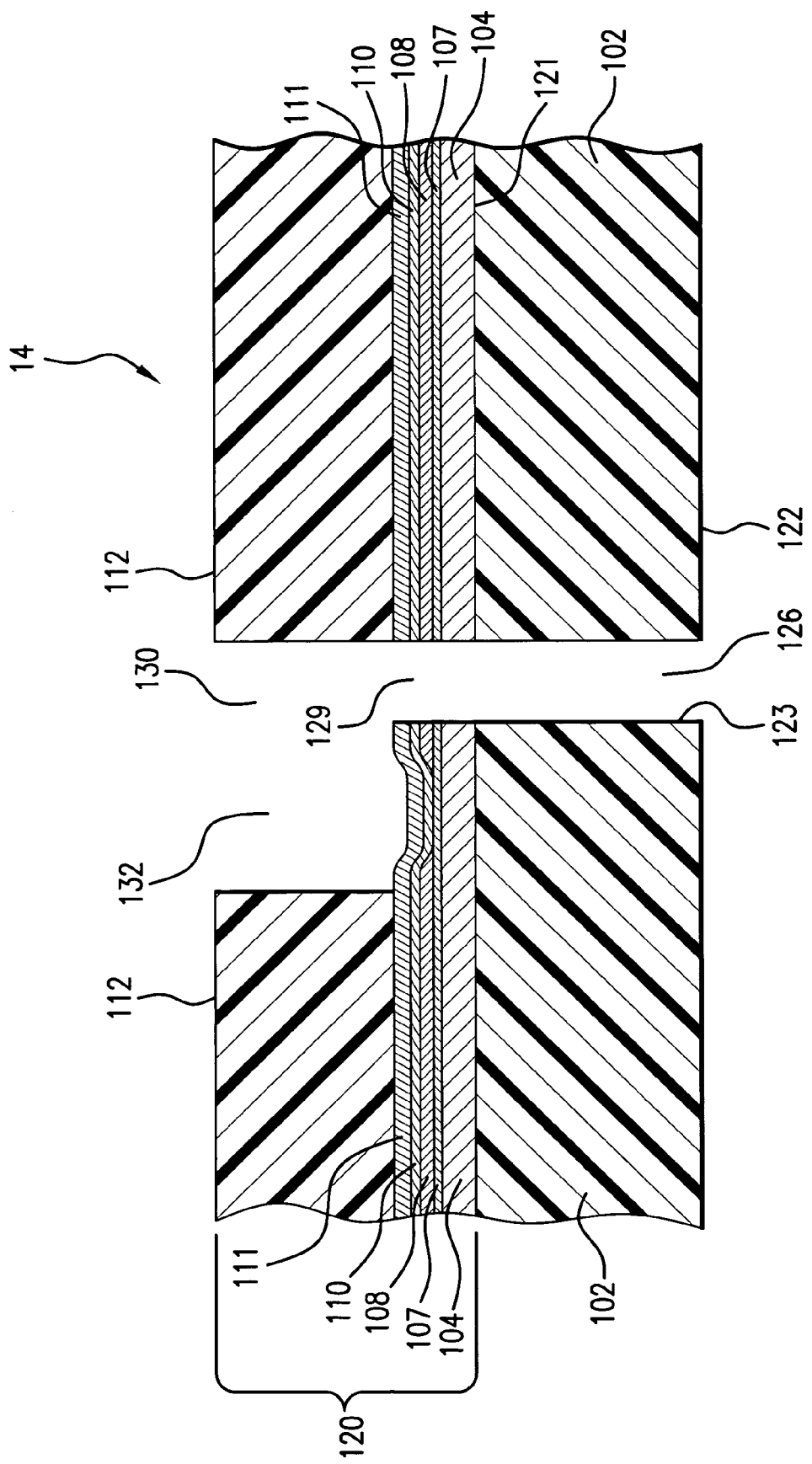
FIG. 2 illustrates a cross-sectional view of an embodiment of the print head of FIG. 1.

FIG. 2 illustrates a cross-sectional view of the printhead 14 of FIG. 1 where the slot 126 having slot (or side) walls 123 is formed through a substrate 102. The formation of the slot through a slot region (or slot area) in the substrate is described in more detail below. In another embodiment, multiple slots are formed in a given die. For example, the inter slot spacing or spacing between adjacent slots in the die or substrate are as low as 10 microns. (In an embodiment, 10 microns is just over twice the extent of a heat affected zone for each slot, where the heat affected zone is the area along the slot walls that is affected by the laser machining described in this application.)

In FIG. 2, thin film layers (or active layers, a thin film stack, electrically conductive layers, or layers with micro-electronics) 120 are formed, e.g. deposited, on a front or first side (or surface) 121 of the substrate 102. The first side 121 of the substrate is opposite a second side (or surface) 122 of the substrate 102. The thin film stack 120 includes at least one layer formed on the substrate, and, in a particular embodiment, masks at least a portion of the first side 121 of the substrate 102. Alternatively or additionally, the layer 120 electrically insulates at least a portion of the first side 121 of the substrate 102.

As shown in the embodiment of the printhead shown in FIG. 2, the thin film stack 120 includes a capping layer 104, a resistive layer 107, a conductive layer 108, a passivation layer 110, a cavitation barrier layer 111, and a barrier layer 112, each formed or deposited over the first side 121 of the substrate 102 and/or the previous layer(s). In one embodiment, the substrate 102 is silicon. In various embodiments, the substrate may be one of the following: single crystalline silicon, polycrystalline silicon, gallium arsenide, glass, silica, ceramics, or a semiconductor material. The various materials listed as possible substrate materials are not necessarily interchangeable and are selected depending upon the application for which they are to be used. In this embodiment, the thin film layers are patterned and etched, as appropriate, to form the resistors 61 in the resistive layer, conductive traces of the conductive layer, and a firing chamber 130 at least in part defined by the barrier layer. In a particular embodiment, the barrier layer 112 defines the firing chamber 130 where fluid is heated by the corresponding resistor and defines a nozzle orifice 132 through which the heated fluid is ejected. In another embodiment, an orifice layer (not shown) having the orifices 132 is applied over the barrier layer 112. Other structures and layouts of layers and components may be utilized as is know in the art.

In the embodiment shown in FIG. 2, a channel 129 is formed through the layers (120) formed upon the substrate. The channel 129 fluidically couples the firing chamber 130 and the slot 126, such that fluid flows through the slot 126 and into the firing chamber 130 via channel 129. In the particular embodiment shown, the channel entrance 129 for the fluid is not in the center of the slot 126. However, the slotted substrate is formed as described herein substantially the same whether the entrance 129 is centrally located or off-center.

While FIGS. 1 and 2 refer to utilizing resistors 61 to cause fluid to be ejected, other fluid ejection elements may be utilized. For example, ultrasonic or piezo-electric transducers may be utilized.

Figure 3:
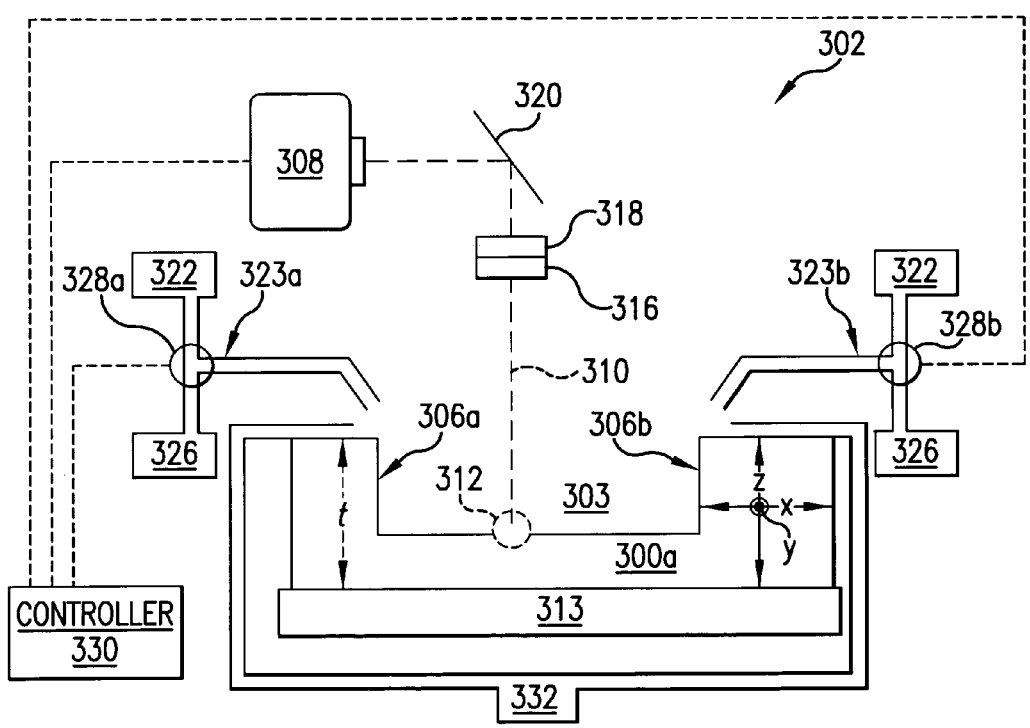
FIG. 3 illustrates a front elevational view of an exemplary laser machining apparatus in accordance with one embodiment.

Referring to FIG. 3, a front elevational view of an exemplary laser machining apparatus in accordance with one embodiment. Laser machine 302 comprises a means for generating optical energy sufficient to remove substrate material to form feature 303. Feature 303 can have various configurations including blind features and through features. A blind feature passes through less than an entirety of the substrate's thickness t measured in the z direction. A feature which extends all the way through the thickness t becomes a through feature. In the illustrated embodiment feature 303 comprises a blind feature extending along the x-axis between a first feature end 306a and a second feature end 306b.

Laser machine 302 can have a laser energy source 308 capable of emitting laser energy 310. The laser energy can contact, or otherwise be directed at, substrate 300a. Exemplary laser energies such as laser energy 310 can provide sufficient energy to melt, vaporize, exfoliate, phase explode, ablate, react with, and/or a combination thereof, among others processes that result in removal of substrate material. The substrate that laser energy 310 is directed at and the surrounding region containing energized substrate material may be referred to as a laser interaction region or zone 312. In some exemplary embodiments substrate 300a can be positioned on a fixture 313 for laser machining. Some such fixtures may be configured to move the substrate along x, y, and/or z coordinates.

Various exemplary embodiments can utilize one or more lenses 316 to focus or to expand laser energy 310. In some of these exemplary embodiments, laser energy 310 can be focused in order to increase its energy density. In these exemplary embodiments the laser energy can be focused with one or more lenses 316 to achieve a desired geometry where the laser energy contacts the substrate 300a. In some of these embodiments a shape can have a diameter in a range from about 5 microns to more than 100 microns. In one embodiment the diameter is about 30 microns. Also laser energy 310 can be pointed directly from the laser source 308 to the substrate 300a, or pointed indirectly through the use of a sensor 318, and/or one or more mirror(s) 320.

In certain embodiments, laser source may provide lasers that provide laser energy at approximately eleven watts from an UV laser source. In other embodiments, the laser energy provided may be at approximately twenty watts from an UV laser source. Further, embodiments may utilize other laser sources, e.g. gas laser sources, solid state laser sources, etc., and be provided at powers less than approximately eleven watts, greater than approximately twenty watts, or between approximately eleven watts and approximately twenty watts.

In some exemplary embodiments laser machine 302 also can have one or more liquid supply structures for selectively supplying, from one or more nozzles at any given time, a liquid or liquids 322 to the laser interaction region 312 and/or other portions of substrate 300a. This embodiment shows two liquid supply structures 323a, 323b. Examples of suitable liquids will be discussed in more detail below.

One or more flow regulators can be utilized to regulate the flow of liquid to the substrate. The present embodiment employs two flow regulators 328a, 328b. Some embodiments can utilize a controller 330 to control the function of laser source 308 and flow regulators 328a, 328b among other components. Controller 330 can, as described in further detail with respect to FIGS. 4 to 6, cease providing the liquid or liquids 322 prior to completing feature 303 to its entire depth. In certain embodiments, controller 330 may be a computer or a specialized controller that has instructions either in a removable media, fixed media, programmed devices, or a combination of these.

Liquid 322 can be supplied at various rates during laser machining. For example, one suitable embodiment utilizing water as a suitable liquid delivers 0.1 gallons/hour to the substrate. Other suitable embodiments can supply water at rates that range from less than 0.01 gallons/hour to at least about 0.4 gallons/hour.

Referring to FIGS. 4A-4E, cross-sectional representations of process steps for laser machining an exemplary substrate in accordance with one embodiment are illustrated. Substrate 400 includes a first surface 402 and a second surface 404, substantially opposing first surface 402. The second surface 404 includes one or more thin film layers 405, formed thereon or therein, which may also be other electronic devices or active structures. The thin film layers 405 are, in one embodiment, covered at least in part by a coating 410. In one embodiment, coating 410 protects thin film layers 405 from debris during the laser machining process. In certain embodiments, coating 410 may be water or other liquid soluble. In other embodiments, coating 410 may absorb energy generated by laser energy 420 that may damage thin film layers 405 or the edges of features formed in substrate 400. In such embodiments, the application of assist liquids may cause debris to adhere to the thin film layers 405. In one embodiment, coating 410 may be comprised of approximately twenty percent isopropyl alcohol, approximately seven percent polyvinyl alcohol, approximately less than one percent of dye material, and water.

In certain embodiments, further protective layers may be interposed between thin film layers 405 and coating 410 in order to further protect the thin film layers form laser damage and/or debris generated during laser processing.

Laser energy 420 is provided by laser energy source 425. Laser energy 420 removes substrate material from the substrate in a designated area to form feature 415, the dimensions of which in certain embodiments, may be a function of the intensity, beam spot size, and material structure.

In order to direct and focus laser energy 420 from laser energy source 425 one or more mirror(s) 430 and lenses 435 may be utilized. As shown in FIGS. 4A-4E, laser energy 420 is substantially orthogonal to first surface 402, though other configurations can be utilized. In this embodiment, laser energy 420 may be moved generally along the x axis from left to right of the page on which the figure appears to continue forming the feature or may remain stationary. Other suitable laser movement patterns for feature formation such as a 'racetrack' pattern may also be utilized.

During or prior to laser energy 420 being provided, liquid 450 is supplied to first surface 402 along path $b_1$ from nozzle 446. Liquid 452 also may be supplied to the first surface 402 from nozzle 448. In one embodiment nozzles 446 and 448 terminate approximately 5-10 millimeters above first surface 402. In further embodiments, a minimum distance between the nozzles 502a, 502b is d plus 10-20 millimeters. Other distances can also utilize in other embodiments.

Liquid supply structures 442 and 444 are configured to supply liquid via nozzles 446 and 448, respectively, during the laser machining process to the area in which feature 415 is being formed. For purposes of explanation in this embodiment, nozzle bores $b_1$, $b_2$ are utilized to identify individual liquid supply paths from individual nozzles 446 and 448

In one embodiment the nozzle bores $b_1$, $b_2$ are oriented at angles α, β respectively relative to first surface 402 of substrate 400. In some embodiments, angles α, β are acute angles relative to substrate's first surface 402. In one embodiment angles α, β comprise about 50 degrees and the first and second bores $b_1$, $b_2$ are oriented about 80 degrees apart as indicated by designator γ. Other angles also can provide suitable embodiments.

In this illustrated embodiment liquid directed at first surface 402 tends to flow across the substrate surface generally toward the opposing nozzle and into feature 415. For example, liquid 450 directed along nozzle bore axis $b_1$ by nozzle 446 tends to contact first surface 402 and to flow toward nozzle 448.

Figure 4A:
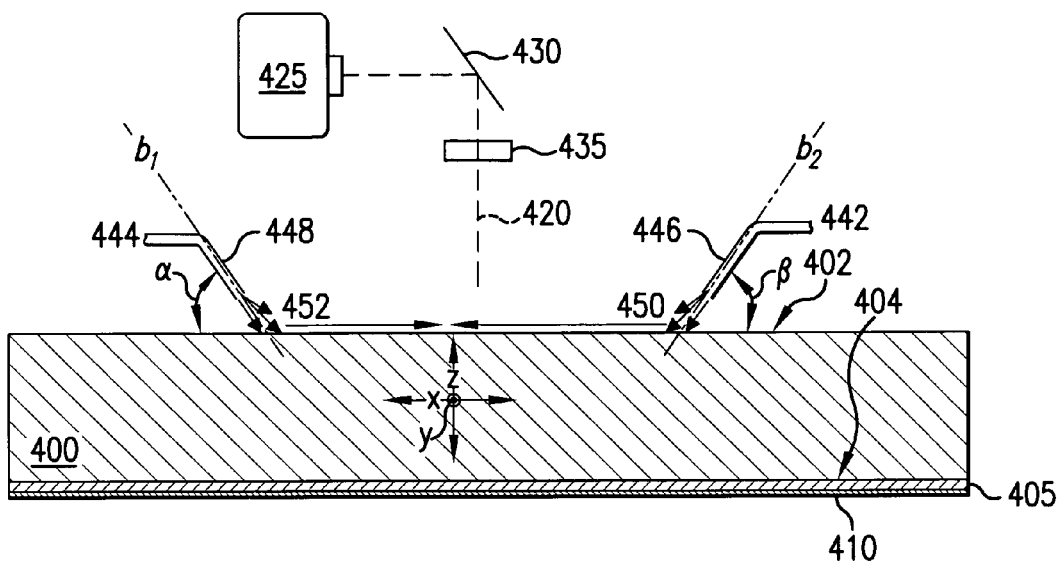
FIG. 4A-E illustrate cross-sectional representations of process steps for laser machining an exemplary substrate in accordance with one embodiment.
Figure 4B:
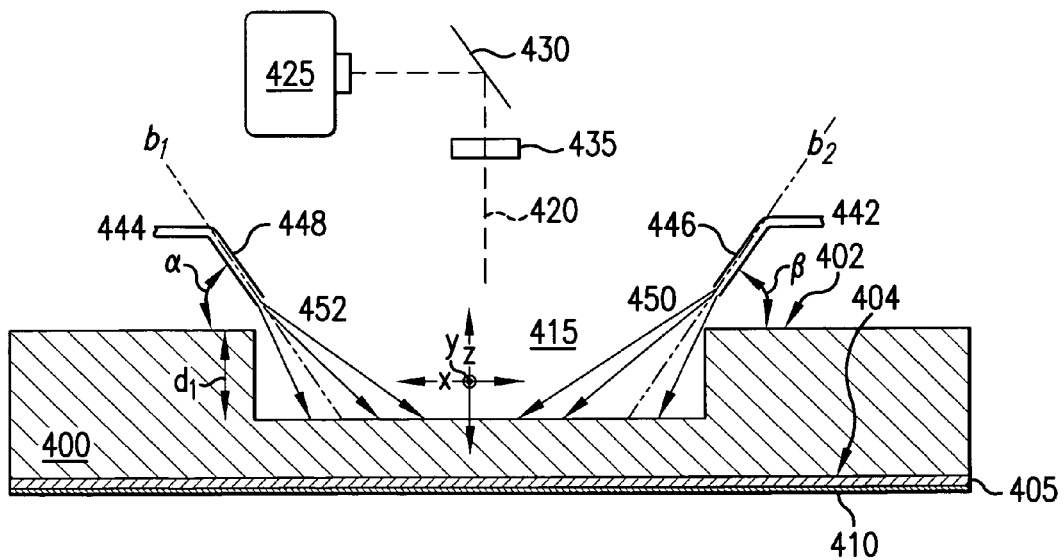

FIG. 4B shows a subsequent view where laser energy 420 continues to remove additional substrate material to form feature 415. Laser energy 420 has completed one pass over substrate 400 from left to right and subsequently moves from right to left. Nozzles 446 and 448 are positioned to remain outside of the scan path while delivering liquid to form the feature 415.

In FIG. 4B a depth $d_1$ of the feature 415 being formed is such that it is less than approximately 90% of the thickness of substrate 400 between first surface 402 and second surface 404. Liquid 450 and 452 are being provided to the feature 415 in order to assist the laser machining process.

Figure 4C:
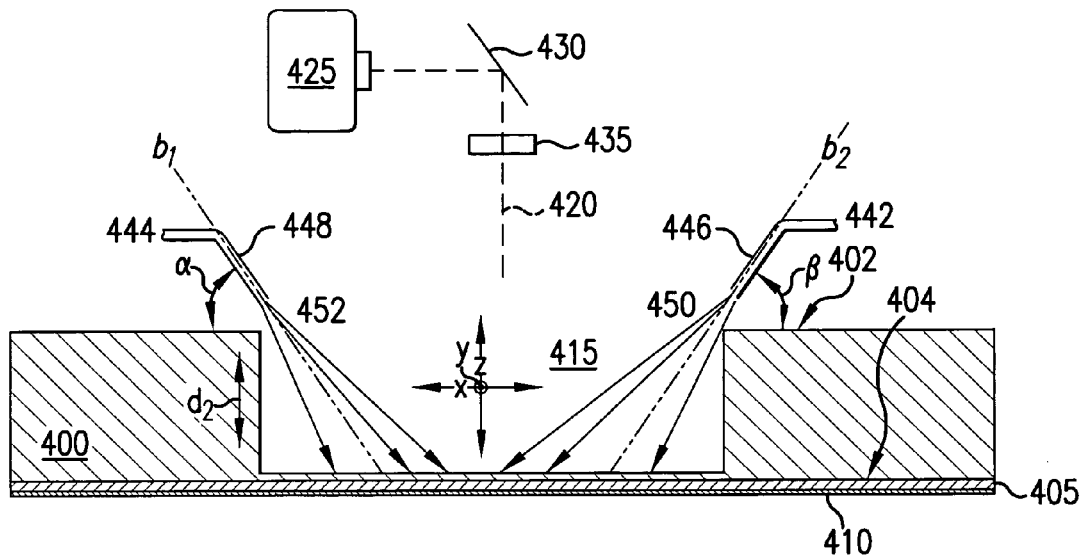

In FIG. 4C, the feature 415 is formed to a depth $d_2$ by further laser energy 420, which may be one or more scan paths. In one embodiment, depth $d_2$ is greater than approximately 90% of the thickness of substrate 400 between first surface 402 and second surface 404. In other embodiments, depth $d_2$ may be between approximately 90% and approximately 98% of the thickness of substrate 400 between first surface 402 and second surface 404.

Up to the point that the feature 415 has a depth equal to approximately depth $d_2$ one or both nozzles 446 and 448 are supplying liquid 450 and 452, respectively, to substrate 400 and more particularly into feature 415. At approximately the time at which feature 415 has depth $d_2$, nozzles 446 and 448 cease supplying liquid 450 and 452. At this time, there remains some liquid in the feature 415 due to the fact that additional liquid 450 and 452 has been supplied that has yet to reach the area where laser energy is being provided and that not all of the liquid within the feature has evaporated.

Figure 4D:
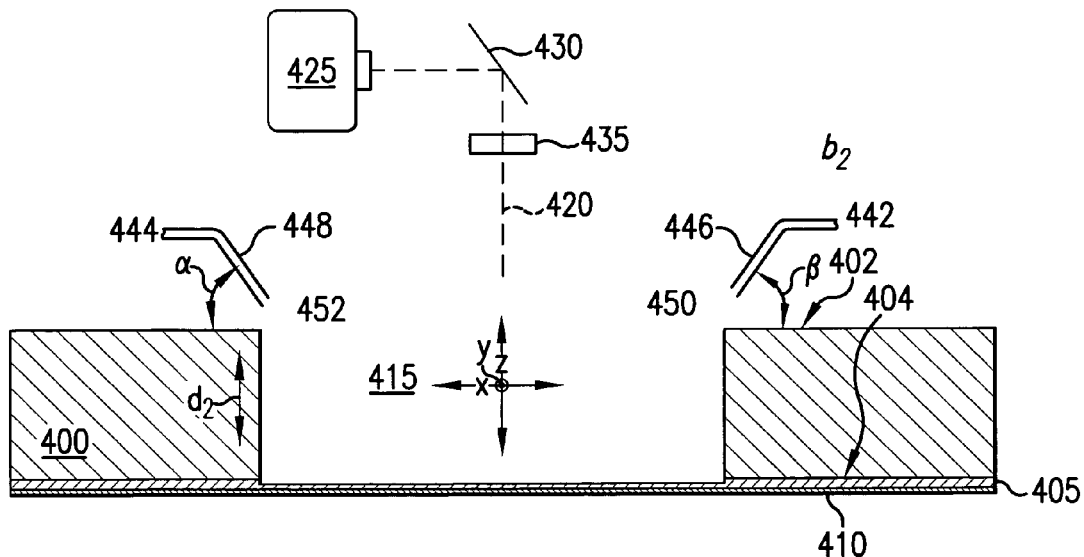

In FIG. 4D, after nozzles 446 and 448 have ceased operation, and not further liquid 450 and 452 is being provided. In FIG. 4D, feature 415 has depth that is through substrate 400 and partially through a portion of the thin film layers 405 that overlie the substrate. At this time, it is likely that almost all, if not all, of the remaining liquid within the feature has been evaporated due to the application of the laser energy 420.

Figure 4E:
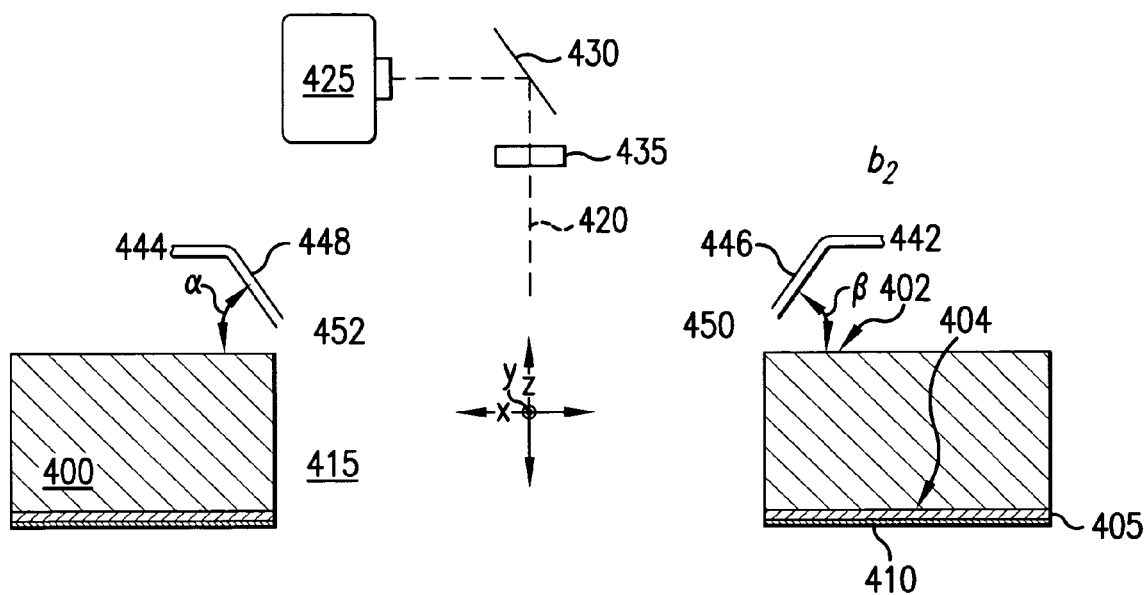

In FIG. 4E, feature 415 has been formed through substrate 400 and the overlying portion of thin film layers 405. As there is no further liquid being provide, coating 410 is maintained overlying those portions of thin film layers 405 that does not overlie feature 415.

In addition, since liquid was utilized during laser machining of at least 80% of the thickness of substrate 400 between first surface 402 and second surface 404, there is very little debris is formed. As such, some embodiments need not utilize a debris extraction system to remove vaporized substrate material and/or molecules formed from substrate material. Other embodiments, may utilize a debris extraction system that may, for example, comprise a vacuum system and filtration system positioned to evacuate material in proximity to the laser energy and substrate. Further embodiments, may utilize standard wafer wash processes to remove debris that is formed.

Various liquid supply structure types can be employed in suitable embodiments. For example, suitable liquid supply structures can comprise air brushes which deliver a liquid aerosol in a pressurized gas. Other suitable liquid supply structures can employ pressurized air or other gas(es) and introduce a liquid utilizing a venturi. Other embodiments may employ an ultrasonic or piezo-electric transducer to atomize water into droplets. Still other embodiments simply may employ pressurized liquid with or without a nozzle to configure the flow as desired. Liquid can be delivered to the laser interaction zone in any suitable form. For example the liquid may comprise an atomized mist, aerosol, droplets and/or a liquid which is not generally interspersed with gas molecules.

In several embodiments, water is utilized as a suitable liquid. Other suitable liquids can comprise among others, organic solvents, water based acids and bases, and water based surfactants among others.

Figure 5A:
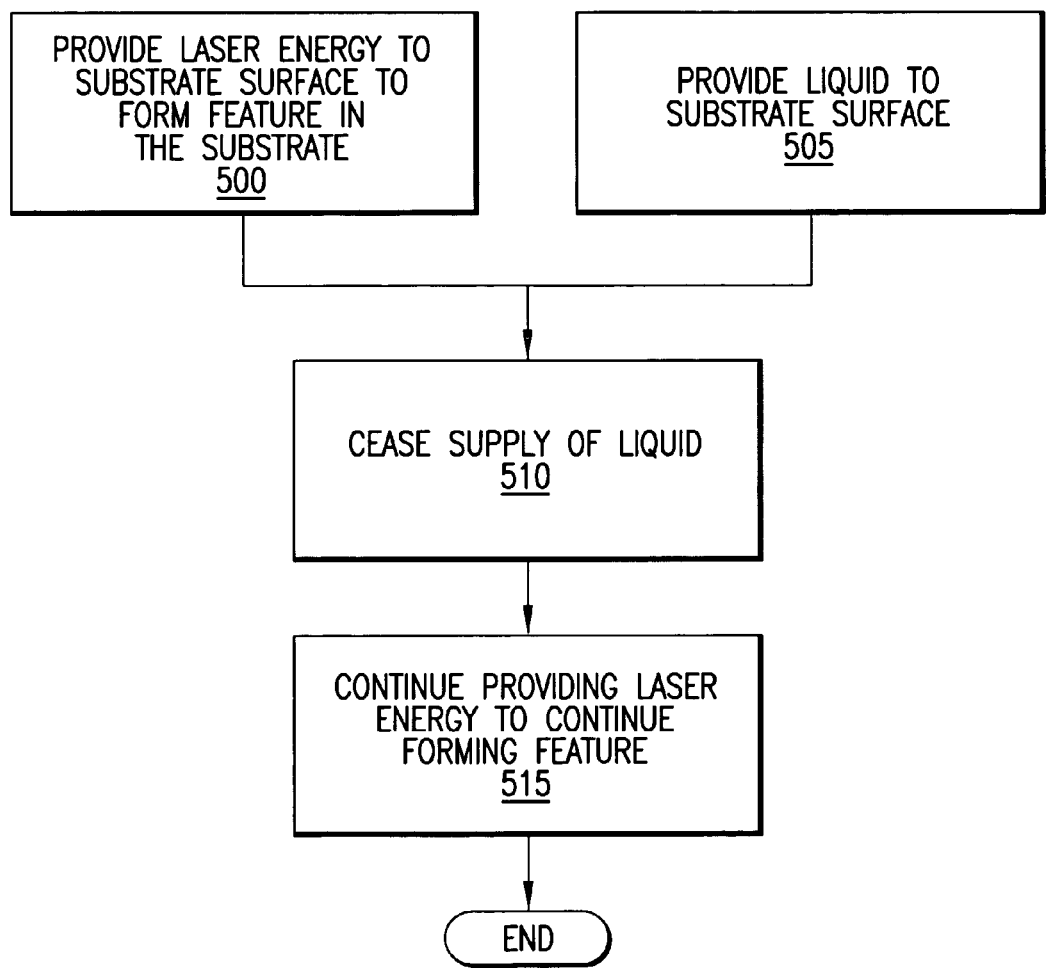
FIGS. 5A-C illustrate process flows of methods for forming features in substrates according to several embodiments.

Referring to FIG. 5A, a process flow of a method for forming features in substrates according to one embodiment is illustrated. Laser energy is provided to form a feature in a substrate, block 500, simultaneously or slightly before laser energy begins to be provided a liquid is supplied to the surface of the substrate in which the feature is being formed, block 505.

After a time during which the feature reaches a predetermine depth, e.g. between approximately 90 to 98% of the thickness of the substrate between the surfaces where the feature is being formed, supply of the liquid is ceased, block 510. When supply of the liquid is ceased, laser energy is still provided until the feature is completed, block 515.

Figure 5B:
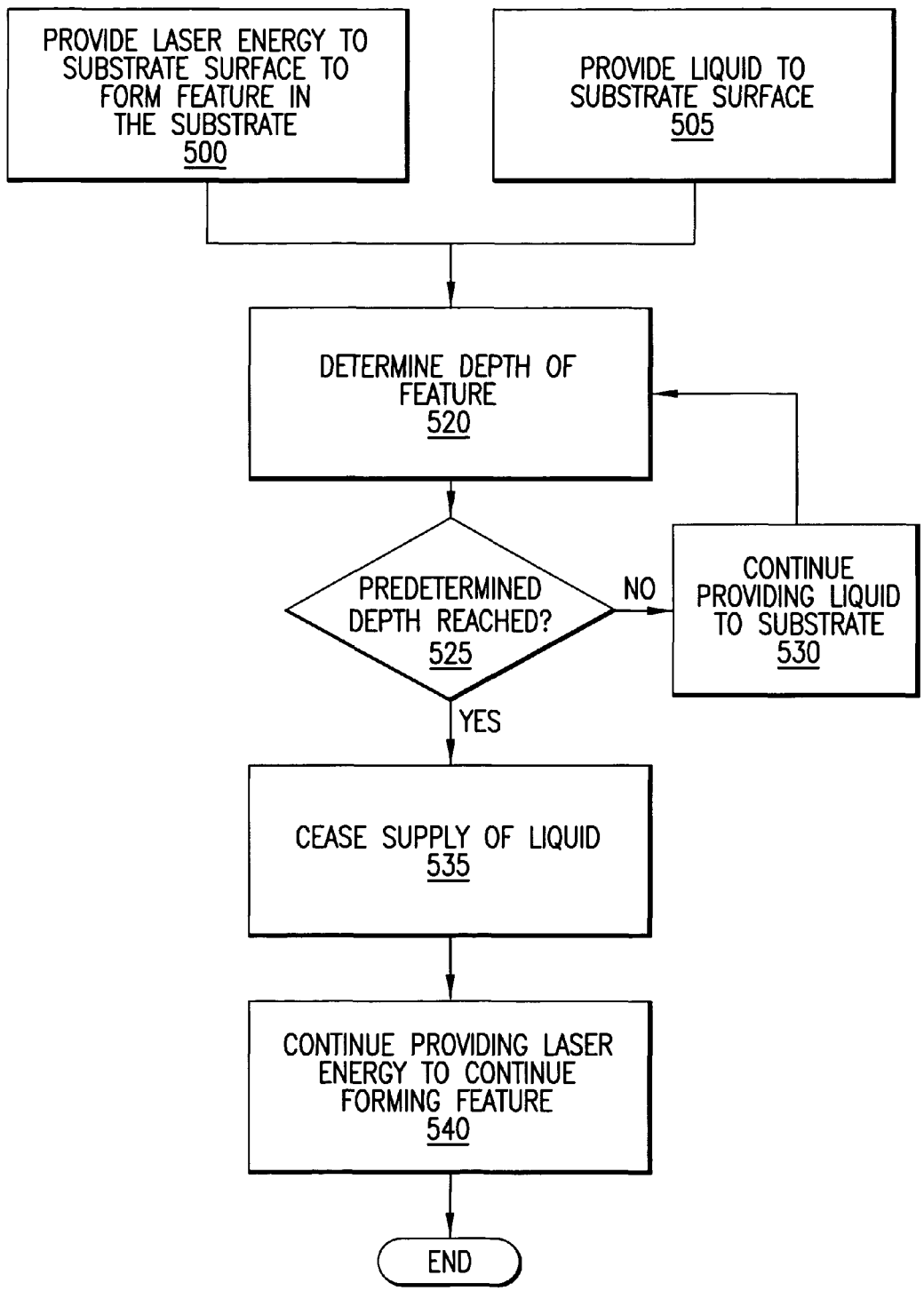

Referring to FIG. 5B, a process flow of a method for forming features in substrates according to another embodiment is illustrated. While laser energy is being provided, block 500, and liquid is being supplied, block 505, the depth of the feature is continuously determined, block 520. In alternate embodiments, the depth may be measured at predetermined increments. In some embodiments, the depth may be measured by use of a reflectometer or laser-based displacement sensor. One embodiment of a refelectometer and a system that utilizes a reflectometer is depicted and disclosed in copending U.S. patent application Ser. No. 10/771,495, filed Feb. 24, 2004 which is incorporated by reference in its entirety as if fully set forth herein.

Until the depth is determined to reach a predetermined level, block 525, liquid is provided to the substrate and the area in which the feature is being formed, block 530. When the depth reaches a predetermined level, supply of the liquid is ceased, block 535, while laser energy is supplied until the feature is formed, block 540.

Figure 5C:
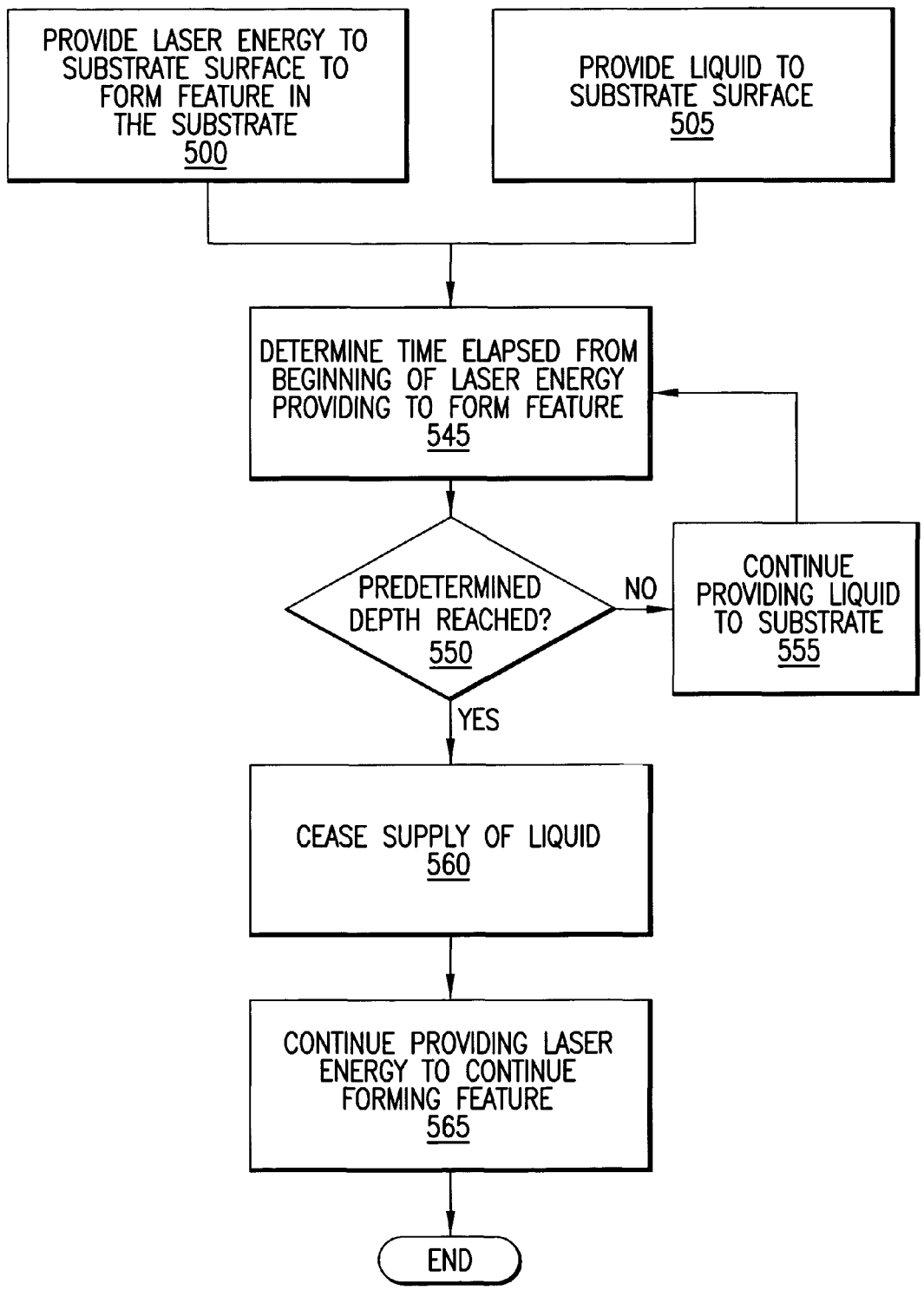

Referring to FIG. 5C, a process flow of a method for forming features in substrates according to an additional embodiment is illustrated. While laser energy is being provided, block 500, and liquid is being supplied, block 505, the time from the beginning of the supply of laser energy is being determined, block 545.

Until the time reaches a predetermined time, block 550, liquid is provided to the substrate and the area in which the feature is being formed, block 555. When the time reaches a predetermined level, supply of the liquid is ceased, block 560, while laser energy is supplied until the feature is formed, block 565. The predetermined time may be based upon prior testing done with the substrate, liquid and laser energy of the specific intensity utilized.

Figure 6:
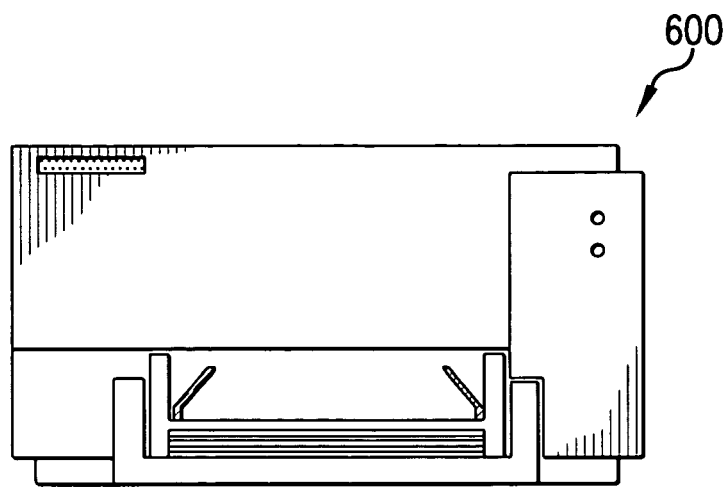
FIG. 6 illustrates a perspective view of an embodiment of a printer.
Figure 7:
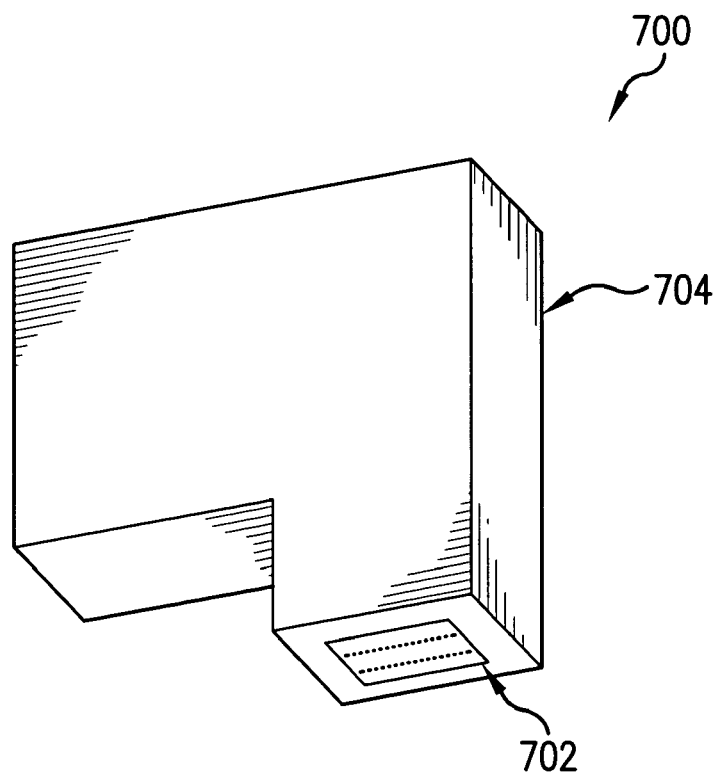
FIG. 7 illustrates a perspective view of an embodiment of a print cartridge.

FIGS. 6 and 7 illustrate examples of products which can be produced utilizing at least some of the described embodiments. FIG. 6 shows a diagrammatic representation of an exemplary printing device that can utilize an exemplary print cartridge. In this embodiment the printing device comprises a printer 600. The printer shown here is embodied in the form of an inkjet printer. The printer 600 can be capable of printing in black-and-white and/or in color. The term "printing device" refers to any type of printing device and/or image forming device that employs slotted substrate(s) to achieve at least a portion of its functionality. Examples of such printing devices can include, but are not limited to, printers, facsimile machines, and photocopiers. In this exemplary printing device the slotted substrates comprise a portion of a print head which is incorporated into a print cartridge, an example of which is described below.

FIG. 7 shows a diagrammatic representation of an exemplary print cartridge 700 that can be utilized in an exemplary printing device. The print cartridge is comprised of a print head 702 and a cartridge body 704 that supports the print head. Though a single print head 702 is employed on this print cartridge 700 other exemplary configurations may employ multiple print heads on a single cartridge.

Print cartridge 700 is configured to have a self-contained fluid or ink supply within cartridge body 704. Other print cartridge configurations alternatively or additionally may be configured to receive fluid from an external supply. Other exemplary configurations will be recognized by those of skill in the art.

Although the inventive concepts have been described in language specific to structural features and methodological steps, it is to be understood that the appended claims are not limited to the specific features or steps described. Rather, the specific features and steps are disclosed as preferred forms of implementing the inventive concepts.

What is claimed is:

1. A method comprising:
    forming a feature in a substrate to a first depth by supplying a liquid to at least an area substantially encompassing the feature while applying laser energy along the first substrate surface, such that some of the liquid remains within the feature;
    ceasing supply of the liquid when the feature has the first depth within the substrate, such that at least substantially all of the liquid remaining within the feature is evaporated by continuing application of the laser energy; and
    forming the feature to a second depth that is greater than the first depth by continuing to apply the laser energy along the first substrate surface such that no liquid is applied during formation of the feature from the first depth to the second depth,
    wherein the first depth is at least approximately ninety percent the thickness of the substrate between a first substrate surface and a second substrate surface that substantially opposes the first substrate surface.

2. The method of claim 1 wherein the liquid comprises water.

3. The method of claim 1 wherein the first depth is no more than approximately ninety eight percent of the thickness of the substrate between the first substrate surface and the second substrate surface.

4. The method of claim 1 further comprising determining a depth of the feature during forming of the feature and wherein when a predetermined depth is reached the predetermined portion is completed.

5. The method of claim 1 wherein supplying the liquid comprises supplying a first liquid along at least a first liquid supply path and supplying a second liquid along at least a second liquid supply path.

6. The method of claim 1 further comprising determining the first depth by measuring a time from beginning application of the laser energy.

7. The method of claim 1 wherein the second substrate surface comprises at least some electrical components and a coating overlying the at least some electrical components and wherein the feature is formed through the first substrate surface and the second substrate surface, the method further comprising removing the coating from the second substrate surface.

8. A method of laser micromachining a substrate comprising:
    forming a feature into a substrate, at least in part, by directing laser energy at the substrate; and,
    during a predetermined portion of said forming, supplying liquid to at least a first region of the feature and ceasing supply of the liquid after the predetermined portion of said forming has occurred,
    wherein some of the liquid remains within the feature while the feature is formed during the predetermined portion of said forming in which the liquid is supplied while the laser energy is directed at the substrate, such that upon ceasing supply of the liquid after the predetermined portion of said forming has occurred, at least substantially all of the liquid remaining within the feature is evaporated by continuing application of the laser energy.

9. The method of claim 8 wherein the liquid comprises water.

10. The method of claim 8 wherein the predetermined portion comprises a depth that is at least approximately ninety percent of a thickness of the substrate between a first surface of the substrate and a second surface of the substrate opposing the first surface, and wherein the laser energy is directed at the first surface.

11. The method of claim 10 wherein the depth is no more than approximately ninety eight percent of the thickness of the substrate between the first surface and the second surface.

12. The method of claim 8 wherein the feature is a through feature formed through a thickness of the substrate between a first surface and a second surface opposing the first surface, and wherein the predetermined portion comprises a predetermined time period beginning when the laser energy is first applied to a predetermined end time.

13. The method of claim 12 wherein the predetermined end time is based upon a ratio of a depth of the feature to a thickness of the substrate between the first substrate surface and the second substrate surface.

14. The method of claim 8 wherein supplying liquid comprises along a first liquid supply path and supplying liquid to at least a second different region of the feature along at least a second liquid supply path.

15. The method of claim 8 further comprising determining a depth of the feature during forming of the feature and wherein when a predetermined depth is reached the predetermined portion is completed.

16. A method comprising:
   directing laser energy at a substrate to remove substrate material; and,
   during a predetermined duration of directing laser energy, selectively delivering liquid to the substrate and ceasing supply of the liquid after the predetermined duration has occurred,
   wherein some of the liquid remains within the feature while the feature is formed during the predetermined duration in which the liquid is supplied while the laser energy is directed at the substrate, such that upon ceasing supply of the liquid after the predetermined duration has occurred, at least substantially all of the liquid remaining within the feature is evaporated by continuing application of the laser energy, and
   wherein the predetermined duration comprises at least half of the time the laser energy is directed at the substrate to form the feature.

17. The method of claim 16 wherein said selectively delivering comprises selectively delivering liquid along a first liquid supply path and a second supply path.

18. The method of claim 16 wherein the predetermined duration is based upon a ratio of a depth of the feature to a thickness of the substrate between the first substrate surface and the second substrate surface.

19. The method of claim 18 wherein the ratio is at least approximately 0.9.

20. The method of claim 19 wherein the ratio is less than approximately 0.98.

21. The method of claim 16 wherein the predetermined duration begins at least at a time approximately when the laser energy is applied to a surface of the substrate.

22. The method of claim 16 wherein the liquid comprises water.

23. A system for defining a fluid path through a substrate, the fluid path being defined between a first surface and a second surface of the substrate, the system comprising:
   a laser source that defines a feature in the first surface;
   a liquid supply apparatus that supplies liquid to at least an area substantially encompassing the feature; and,
   means for instructing the liquid supply apparatus to cease supply of the liquid based upon a status of the feature during formation of the feature, wherein prior to ceasing the supply of the liquid, some of the liquid remains within the feature during formation of the feature, such that thereafter the laser source is further to evaporate at least substantially all of the liquid remaining within the feature.

24. The system of claim 23 wherein the liquid comprises water.

25. The system of claim 23 wherein status of the feature comprises a depth of the feature, and wherein the depth at which the means instructs the liquid supply apparatus to cease supply of the liquid is equal to approximately at least ninety percent of the thickness of the substrate between the first surface and the second surface.

26. The system of claim 25 wherein the depth is no more than approximately ninety eight percent of the thickness of the substrate between the first surface and the second surface.

27. The system of claim 25 further comprising means for determining a depth of the feature during forming of the feature, and wherein the means for instructing provides instructions for ceasing supply of the liquid based upon information provided by the means for determining.

28. The system of claim 23 further comprising means for determining a time from beginning application of the laser energy and wherein the means for instructing the liquid supply apparatus instructs the liquid supply apparatus to cease supply of the liquid based upon information from the means for determining the time.

29. A computer readable medium including instruction for operating a computer that controls a laser source, the instructions comprising:
   instructions for forming a feature in a substrate to a first depth by supplying a liquid to at least an area substantially encompassing the feature while applying laser energy along the first substrate surface, such that some of the liquid remains within the feature;
   instructions for ceasing supply of the liquid when the feature has the first depth within the substrate, such that at least substantially all of the liquid remaining within the feature is evaporated by continuing application of the laser energy; and
   instructions for forming the feature to a second depth that is greater than the first depth by continuing to applying the laser energy along the first substrate surface such that no liquid is applied during formation of the feature from the first depth to the second depth,
   wherein the first depth is at least approximately eight percent the thickness of the substrate between a first substrate surface and a second substrate surface that substantially opposes the first substrate surface.

30. A computer readable medium including instruction for operating a computer that controls a laser source, the instructions comprising:
   instructions for forming a feature into a substrate, at least in part, by directing laser energy at the substrate; and,
   instructions for during a predetermined portion of said forming, supplying liquid to at least a first region of the feature and for ceasing supply of the liquid after the predetermined portion of said forming has occurred,
   wherein some of the liquid remains within the feature while the feature is formed during the predetermined portion of said forming in which the liquid is supplied while the laser energy is directed at the substrate, such that upon ceasing supply of the liquid after the predetermined portion of said forming has occurred, at least substantially all of the liquid remaining within the feature is evaporated by continuing application of the laser energy.

31. A computer readable medium including instruction for operating a computer that controls a laser source, the instructions comprising:
   instructions for directing laser energy at a substrate to remove substrate material; and,
   instructions for during a predetermined duration of directing laser energy, selectively delivering liquid to the substrate and for ceasing supply of the liquid after the predetermined duration has occurred,
   wherein some of the liquid remains within the feature while the feature is formed during the predetermined duration in which the liquid is supplied while the laser energy is directed at the substrate, such that upon ceasing supply of the liquid after the predetermined duration has occurred, at least substantially all of the liquid remaining within the feature is evaporated by continuing application of the laser energy, and
wherein the predetermined duration comprises at least half of the time the laser energy is directed at the substrate to form the feature.

* * * * *

UNITED STATES PATENT AND TRADEMARK OFFICE
CERTIFICATE OF CORRECTION

PATENT NO.       : 7,923,658 B2                                      Page 1 of 1
APPLICATION NO.  : 10/976555
DATED            : April 12, 2011
INVENTOR(S)      : Mark Huth et al.

It is certified that error appears in the above-identified patent and that said Letters Patent is hereby corrected as shown below:

In column 10, line 30, in Claim 29, delete "applying" and insert -- apply --, therefor.

Signed and Sealed this
Sixth Day of September, 2011

David J. Kappos
*Director of the United States Patent and Trademark Office*